(12) United States Patent
Molaison et al.

(10) Patent No.: US 8,398,743 B2
(45) Date of Patent: Mar. 19, 2013

(54) METHODS AND SYSTEMS FOR REDUCING CARBON DIOXIDE IN COMBUSTION FLUE GASES

(75) Inventors: Jennifer Lynn Molaison, Marietta, GA (US); Alan Smithies, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 968 days.

(21) Appl. No.: 11/801,043

(22) Filed: May 8, 2007

(65) Prior Publication Data

US 2008/0276803 A1 Nov. 13, 2008

(51) Int. Cl.
*B01D 53/22* (2006.01)

(52) U.S. Cl. .............. 95/51; 95/210; 95/236; 96/234; 96/290

(58) Field of Classification Search .......... 95/45, 51, 95/210–211, 183, 236; 96/4, 8, 234, 290, 96/274, 296
See application file for complete search history.

(56) References Cited

U.S. PATENT DOCUMENTS

| | | | | |
|---|---|---|---|---|
| 4,187,390 A * | 2/1980 | Gore | ............... | 174/102 R |
| 5,254,143 A | 10/1993 | Anazawa et al. | | |
| 5,281,254 A * | 1/1994 | Birbara et al. | ............ | 95/44 |
| 5,618,332 A * | 4/1997 | Ekiner et al. | ............ | 95/51 |
| 5,749,941 A * | 5/1998 | Jansen et al. | ............ | 95/44 |
| 5,832,712 A | 11/1998 | Ronning et al. | | |
| 6,168,648 B1 | 1/2001 | Ootani et al. | | |
| 6,228,145 B1 * | 5/2001 | Falk-Pedersen et al. | ...... | 95/44 |
| 6,355,092 B1 * | 3/2002 | Jansen et al. | ............ | 95/45 |
| 6,616,841 B2 * | 9/2003 | Cho et al. | ............ | 210/321.83 |
| 6,926,829 B2 * | 8/2005 | Dannstrom et al. | ...... | 210/321.88 |
| 7,255,842 B1 * | 8/2007 | Yeh et al. | ............ | 423/234 |
| 7,641,717 B2 | 1/2010 | Gal | | |
| 2007/0256559 A1 * | 11/2007 | Chen et al. | ............ | 95/169 |
| 2012/0160099 A1 * | 6/2012 | Shoji et al. | ............ | 95/139 |

FOREIGN PATENT DOCUMENTS

| | | |
|---|---|---|
| CN | 1488422 A | 4/2004 |
| EP | 0451715 A1 | 10/1991 |
| JP | 39029424 B | 12/1964 |
| JP | 3296413 A | 12/1991 |
| JP | 5023553 A | 2/1993 |
| JP | 6063341 A | 3/1994 |
| JP | 09509608 A | 9/1997 |
| JP | 11179167 A | 7/1999 |

(Continued)

OTHER PUBLICATIONS

Fuel Processing Technology 86 (2005) 1533-1546 "Semi-batch absorption and Regeneration Studies for CO2 Capture by Aqueous Ammonia", Yeh et al.*

Minh T. Ho, Greg Leamon, Guy W. Allinson and Dianne E. Wiley; Economics of CO2 and Mixed Gas Geosequestration of Flue Gas Using Gas Separation Membranes; Ind. Eng. Chem. Res. 2006; Sep. 14, 2005; vol. 45; pp. 2546-2552: American Chemical Society.

(Continued)

*Primary Examiner* — Robert A Hopkins

(74) *Attorney, Agent, or Firm* — Armstrong Teasdale LLP

(57) ABSTRACT

A method for processing flue-gas, in an exemplary embodiment, includes providing an absorber unit having a membrane contactor, channeling a combustion flue gas along a first surface of the membrane contactor, and channeling an ammonia-based liquid reagent along a second opposing surface of the membrane contactor. The method also includes partially separating the ammonia-based liquid from the flue gas such that the ammonia-based liquid and the flue gas contact at gas-liquid interface areas, defined by a plurality of pores of the membrane contactor, to separate $CO_2$ from the flue gas by a chemical absorption of $CO_2$ within the ammonia-based liquid to produce a $CO_2$-rich ammonia-based liquid.

20 Claims, 2 Drawing Sheets

FOREIGN PATENT DOCUMENTS

| | | |
|---|---|---|
| JP | 2001504385 A | 4/2001 |
| JP | 2008508099 A | 3/2008 |
| WO | 9926712 | 6/1999 |
| WO | 2007101397 A1 | 9/2007 |

OTHER PUBLICATIONS

Fred Wiesler, Hoeschst Celanese Corp.; Membranes—Membrane Contactors: An Introduction to the Technology; Ultrapure Water; May/Jun. 1996; UP130427; pp. 27-31; Tall Oaks Publishing, Inc.

Examination Report, Application No. GB0808085.5, dated Oct. 19, 2011, pp. 3.

Hsunling Bai et al., "Removal of CO2 Greenhouse Gas by Ammonia Scrubbing", Industrial & Engineering Chemistry Research, vol. 36, No. 6, 2490-2493, 1997.

Chinese Office Action issued Nov. 8, 2011 from corresponding CN Application No. 200810096296.6 and unofficial English translation.

JP Office Action dated Oct. 16, 2012 from JP Application No. 2008-120959, along with English translation.

\* cited by examiner

METHODS AND SYSTEMS FOR REDUCING CARBON DIOXIDE IN COMBUSTION FLUE GASES

BACKGROUND OF THE INVENTION

This invention relates generally to industrial combustion systems, and more particularly to methods and systems for removing carbon dioxide ($CO_2$) from combustion flue gases.

At least some known carbon separation technologies intervene at different points in coal and/or natural gas systems. For example, carbon separation technologies that separate $CO_2$ from combustion flue gases are generally known as post-combustion carbon separation technologies. Known post-combustion carbon separation technologies include processes such as, but not limited to, physical absorption, cryogenic separation, solid sorbent separation, chemical looping combustion, chemical absorption, and/or membrane separation.

Some known chemical absorption processes attempt to remove $CO_2$ from the flue gases by an exothermic reaction of $CO_2$ with separation solvents, for example, potassium carbonate, sodium hydroxide, and amine-based solvents. Known amine-based liquids may include alkanol amines, for example, diethanolamine, triethanolamine, activated methyl diethanolamine, and monoethanolamines (MEA). During a known chemical absorption process, for example, a flue gas and an amine-based liquid such as MEA counter-currently flow within an absorber (scrubber). The flue gas may enter the scrubber near a bottom end, flow upward, and exit near an opposing top end. The liquid may enter the scrubber near the top end, flow downward, and exit near the bottom end.

A $CO_2$-rich liquid amine-based solution is formed by a chemical reaction of the flue gas and the MEA liquid in the scrubber. The $CO_2$-rich liquid is then channeled to a desorber (stripper). The stripper heats the $CO_2$-rich liquid to reverse the chemical reaction such that the absorbed $CO_2$ is released from the liquid. The released $CO_2$ may be subsequently compressed and transported to storage, and the $CO_2$-lean liquid may be recycled and reused in the scrubber.

The combustion flue gas stream generally includes a smaller volume of $CO_2$ as compared to a larger volume of the flue gas. Known scrubbers generally require equipment sizes capable of processing the larger volumes of flue gas. During processing within known scrubbers, the flue gas is dispersed into the liquid causing gas bubbles to be formed within the liquid. The $CO_2$ absorption amount of the liquid partially depends on a total gas-liquid contact area, which is the sum of the surface areas of the gas bubbles. The liquid may absorb $CO_2$ and other impurities, for example, carbon oxysulfide and carbon bisulfide. Such known impurities may cause foaming of the liquid and/or liquid degradation due to irreversible reactions with the impurities. Also, a driving force that is required to separate the $CO_2$ from the flue gas is determined based on a concentration (density) of flue gas components. The scrubber footprint and stripper regeneration energy increases capital cost, operating costs, and energy consumption. A plant capacity is also reduced because of electrical power consumption in known chemical absorption processes.

Some known membrane separation processes include porous membranes that allow selective permeation of gases. The $CO_2$ absorption amount in the liquid partially depends on the physical interaction between flue gases and membrane materials, for example, polyimide and polyolefin. Membrane materials and pore sizes partially affect the degree in which one flue gas component permeates the pores as compared to other flue gas components. Compression of the flue gas is generally used to provide the driving force for permeation because a driving force that is used to separate the $CO_2$ from the flue gas is a pressure differential across the membrane. Therefore, a separation solvent and a stripper are not required for membrane $CO_2$ separation as compared to known chemical absorption processes. Additional compression of the separated $CO_2$ may be used for $CO_2$ transport and/or storage. Although known membrane separation processes generally use smaller scrubber sizes, such known scrubbers may produce a lesser amount of separated $CO_2$ as compared to $CO_2$ released using a chemical absorption process. As such, multiple recycling and processing of the flue gas may be needed in a smaller scrubber to achieve the same degree of $CO_2$ separation as a larger scrubber that processes a similar amount of flue gas. The additional flue gas processing and compression further increase energy consumption and costs.

BRIEF DESCRIPTION OF THE INVENTION

In one aspect, a method for processing flue-gas is provided. The method includes providing an absorber unit having a membrane contactor; channeling a combustion flue gas along a first surface of the membrane contactor; and channeling an ammonia-based liquid reagent along a second opposing surface of the membrane contactor. The method also includes partially separating the ammonia-based liquid from the flue gas such that the ammonia-based liquid and the flue gas contact at gas-liquid interface areas, defined by a plurality of pores of the membrane contactor, to separate $CO_2$ from the flue gas by a chemical absorption of $CO_2$ within the ammonia-based liquid to produce a $CO_2$-rich ammonia-based liquid.

In another aspect, a combustion system is provided that includes an absorber unit. The absorber unit includes a housing for channeling a combustion flue gas; an ammonia-based liquid reagent channeled within the housing; and a membrane contactor coupled within the housing to separate the ammonia-based liquid from the flue gas. The membrane contactor includes a plurality of pores defining gas-liquid interface areas, with the ammonia-based liquid and the flue gas contacting at the gas-liquid interface areas to separate carbon dioxide from the flue gas by a chemical absorption of $CO_2$ within the ammonia-based liquid to provide a $CO_2$-rich ammonia-based liquid. The combustion system also includes a desorber unit coupled to the absorber unit, so that the desorber unit receives and releases $CO_2$ from the $CO_2$-rich ammonia-based liquid.

In another aspect, a flue-gas processing system is provided. The flue-gas processing system includes a housing for channeling a combustion flue gas; an ammonia-based liquid reagent channeled within the housing; and a membrane contactor coupled within the housing to separate the ammonia based liquid from the flue gas. The membrane contactor includes a plurality of pores defining gas-liquid interface areas. The ammonia-based liquid and the flue gas contact at the gas-liquid interface areas to separate carbon dioxide from the flue gas by a chemical absorption of $CO_2$ within the ammonia-based liquid to provide a $CO_2$-rich ammonia-based liquid.

DETAILED DESCRIPTION OF THE INVENTION

The exemplary methods and systems described herein overcome the disadvantages of known post-combustion carbon separation technologies by combining ammonia-based chemical absorption processes and hydrophobic membrane contactors.

Figure 1:
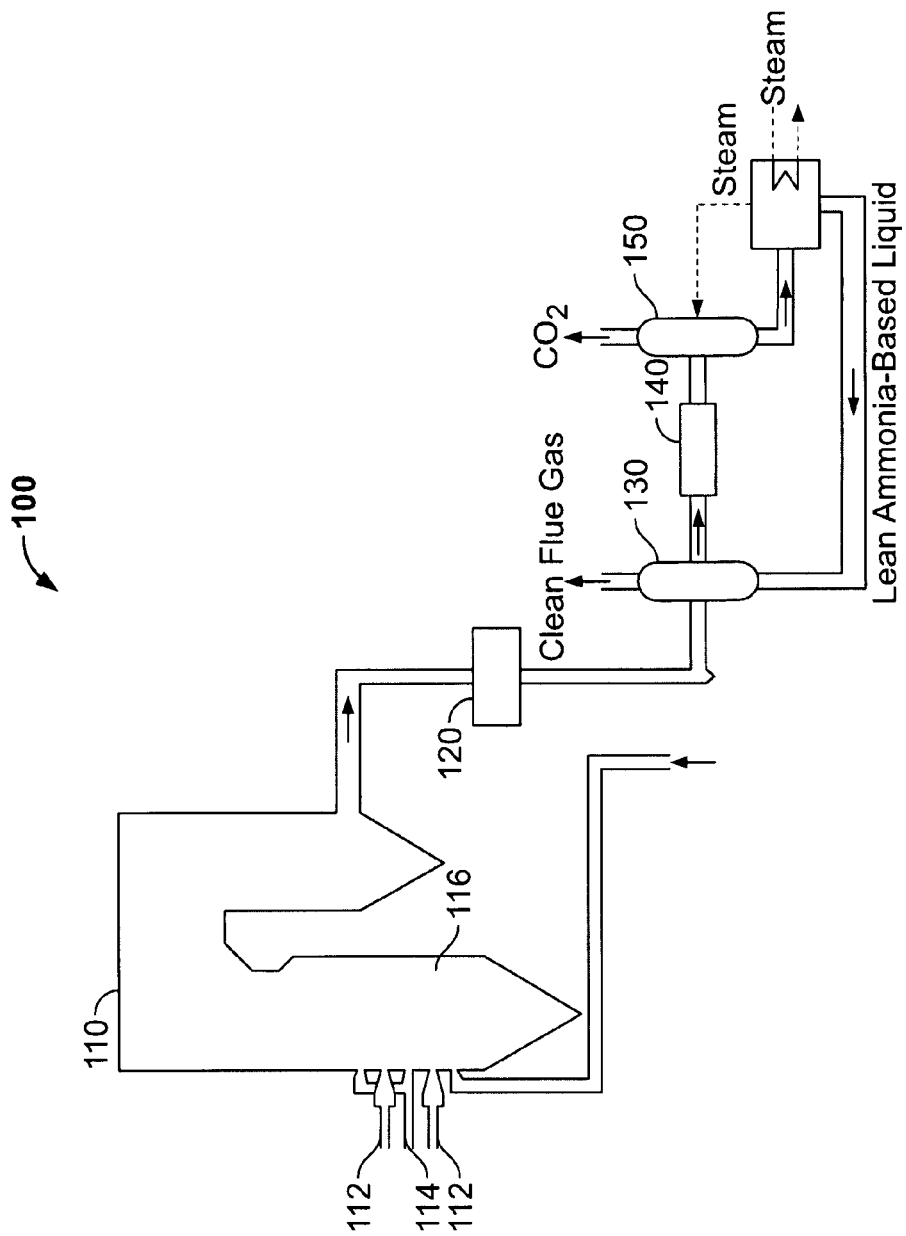
FIG. 1 is a schematic diagram of an exemplary combustion system including a carbon dioxide scrubber.

FIG. 1 is a schematic diagram of an exemplary combustion system 100 that includes a furnace/boiler 110, optional pollution control devices 120, a $CO_2$ absorber (scrubber) 130, a preheater 140, a desorber (stripper) 150, and a steam generator 160. Furnace/boiler 110 serves as a combustion chamber that includes fuel injection ports 112, air injection ports 114, and a combustion zone 116. In the exemplary embodiment, at least one fuel injection port 112 and at least one air injection port 114 are coupled to furnace/boiler 110 to inject fuel and air, respectively, into combustion zone 116.

After combustion of the fuel, a generated combustion exhaust gas, also known as a combustion flue gas, is optionally channeled in a transport stream into pollution control devices 120, for example, electrostatic precipitators, and/or filter baghouses, to undergo various environmental clean-up processes prior to $CO_2$ separation within scrubber 130. The pollution control devices 120 may include environmental clean-up processes that facilitate removing impurities, for example, nitrogen oxides ($NO_x$), sulfur oxides ($SO_x$), fly-ash, oxygen, and/or other particulate matter present in the flue gas which may cause liquid absorption degradation.

Any remaining flue gas is then channeled to scrubber 130. Scrubber 130 processes the flue gas by using an ammonia-based liquid to facilitate separating $CO_2$ from the flue gas (later described in more detail). After flue gas processing, the $CO_2$-free flue gas is optionally discharged to the ambient air, and the $CO_2$-rich ammonia-based liquid solution is channeled to preheater 140.

The $CO_2$-rich ammonia-based liquid is then channeled to stripper 150. Stripper 150 reduces pressure and/or increases temperature of the $CO_2$-rich liquid to facilitate releasing $CO_2$ from the liquid. In the exemplary embodiment, steam generator 160 produces steam to reverse the chemical reaction by heating the $CO_2$-rich liquid to facilitate regenerating the $CO_2$ from the liquid. The released $CO_2$ is then compressed and/or dried for storage and/or transportation. The $CO_2$-free ammonia-based liquid is then recycled and channeled to scrubber 130 for subsequent flue gas processing.

Figure 2:
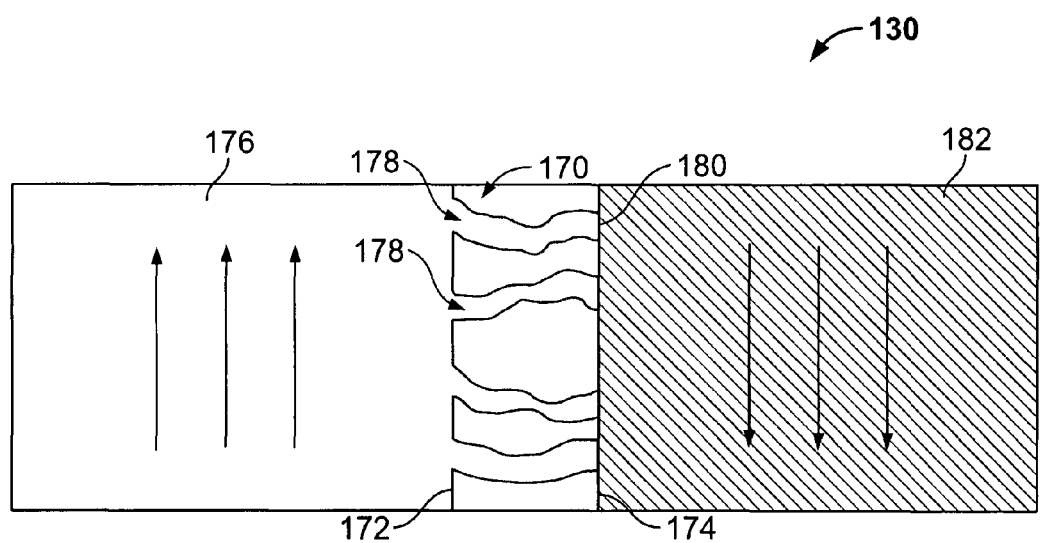
FIG. 2 is a schematic diagram of the exemplary $CO_2$ scrubber shown in FIG. 1.

FIG. 2 is a schematic diagram of scrubber 130 (shown in FIG. 1). In the exemplary embodiment, scrubber 130 operates to integrate membrane separation and ammonia-based chemical absorption technologies to capture $CO_2$ from the flue gas. Scrubber 130 includes gas-liquid membrane contactors 170 fabricated from hydrophobic material, for example, polytetrafluoroethylene (PTFE), including expanded polytetrafluoroethylene (ePTFE). Membrane contactors 170 each include a surface 172, an opposing surface 174, and micro-pores 178 that extend through contactor 170 and receive flue gas during processing. It should be appreciated that membrane contactors 170 may be fabricated as inert hollow fibers, substantially planar sheets, and/or other known structures packaged in a tube-and-shell arrangement, spiral-wound module, and/or other known configurations. Because membrane contactors 170 are densely packaged as hollow fiber and/or modular units in the exemplary embodiment, membrane contactors 170 provide a greater gas-liquid contact area per unit volume as compared to known scrubbers implementing only chemical absorption processes. As such, a smaller footprint of scrubber 130 can be customized and/or retrofitted to known industrial combustion systems. Also, PTFE membrane contactors 170 increase the surface area contact between the gas and liquid streams, making absorption more efficient than traditional absorption column configurations.

In the exemplary embodiment, membrane contactors 170 facilitate non-selective flow of flue gas components 176 into micro-pores 178 defined therein as compared to known porous separation membranes that selectively facilitate passage of flue gas components. Because membrane contactors 170 are hydrophobic, membrane contactors 170 facilitate preventing convective liquid flow across membrane contactor 170. Based on such hydrophobic and micro-porous material characteristics, membrane contactors 170 facilitate contacting flue gas components 176 and an ammonia-based liquid without dispersion of one phase in another.

Because membrane contactor 170 acts as a gas permeable barrier between the gas and liquid phases, membrane contactors 170 do not actually separate $CO_2$ from flue gas as compared to known porous separation membranes. Instead, ammonia-based liquid 182 provides the exemplary hybrid process $CO_2$ separation selectivity. In the exemplary embodiment, membrane contactors 170 act as contacting mediums between flue gas 176 and ammonia-based liquid 182 to facilitate $CO_2$ separation from flue gas 176 based on a chemical absorption process. In other words, $CO_2$ separation within scrubber 130 is determined by a reaction of flue gas 176 with the ammonia-based liquid separating agent within scrubber 130 as discussed in greater detail herein.

In the exemplary embodiment, the contact area between flue gas 176 and ammonia-based liquid 182 is an area sum of all gas-liquid interfaces 180 of all membrane contactors 170 provided within the scrubber. A packing density of membrane contactors 170 and/or micro-pores 178 provide a larger overall gas-liquid surface area contact as compared to total gas bubble surface areas caused by gas dispersion using known chemical absorption processes. As a result, membrane contactors 170 facilitate increasing $CO_2$ absorption efficiency as compared to known chemical absorption processes.

In the exemplary embodiment, membrane contactor 170 is fabricated from hydrophobic materials such as PTFE. Particularly, membrane contactor is fabricated from expanded polytetrafluoroethylene (ePTFE). Expanded polytetrafluoroethylene has a surface area of about 10 to about 100 $m^2$/gr and a void volume of about 90% to about 95%. The surface area and void content of expanded polytetrafluoroethylene permits flue 176 gas to contact ammonia-based liquid 182.

The PTFE material is suitable for flue gas processing operations as discussed with respect to the exemplary embodiment. For example, flue gas 176 generally has negligible amounts of hydrocarbon and large amounts of $CO_2$. Also, in flue gas processing operations within scrubber 130, flue gas 176 is generally processed at about 50° C. to about 100° C., in another embodiment, about 50° C. to about 80° C., and all subranges therebetween. Because $CO_2$ from flue gas 176 is absorbed by ammonia-based liquid 182 at ambient conditions, for example, about 50° C., pre-heating $CO_2$ and/or ammonia-based liquid 182 is not needed as compared to known systems known systems that attempt to separate $CO_2$ from flue gas using other liquid separating agents. As a result, ammonia-based liquid 182 facilitates reducing operating cost associated with $CO_2$ absorption using other liquid separating agents.

Because PTFE is generally inert to flue gas components, membrane contactor 170 is fabricated from PTFE and/or other similar materials that are inert to flue gas 176. As a result of PTFE material, membrane contactor 170 does not swell under flue gas processing operations as compared to known off-shore oil drilling and/or sweetening operations. Also, PTFE facilitates controlling sizes of micro-pores 178 to control gas-liquid contact areas for increasing $CO_2$ absorption efficiency.

In the exemplary embodiment, ammonia-based liquid 182 also facilitates increasing $CO_2$ absorption efficiency as compared to known chemical absorption processes. Ammonia-based liquid 182 has higher reaction energies and absorption capabilities as compared to other types of known liquid separating agents such as amine-based liquids. As a result of using ammonia as a liquid separating agent, ammonia-based liquid 182 facilitates reducing an amount of liquid that is capable of absorbing approximately equal amounts of $CO_2$ as compared to other types of known liquid separating agents such as amine-based liquids. Because less ammonia-based liquid 182 is required for $CO_2$ absorption, less heat/steam is required to regenerate $CO_2$ from ammonia-based liquid 182 as compared to known systems that attempt to regenerate $CO_2$ from other liquid separating agents. As such, a reduction in cost associated with regeneration is facilitated.

During flue gas processing in the exemplary embodiment, flue gas 176 and ammonia-based liquid 182 are channeled on opposite sides of membrane contactor 170 provided within scrubber 130. Although flue gas 176 and ammonia-based liquid 182 are illustrated as counter-current flows, it should be appreciated that flue gas 176 and ammonia-based liquid 182 may flow concurrently in a same direction. As describe above, mass $CO_2$ transfer from flue gas 176 occurs by diffusion of $CO_2$ through gas-liquid interfaces 180 using ammonia-based liquid 182 in a chemical absorption process as discussed in greater detail herein.

In the exemplary embodiment, a partial pressure gradient is applied within scrubber 130 to transfer $CO_2$ mass through diffusion from a gas phase to a liquid phase by lowering a pressure of the flue gas portion that is in contact with ammonia-based liquid 182. It should be appreciated that a vacuum, inert gas, and/or other driving force can create the necessary driving force for $CO_2$ mass transfer. By controlling pressure differences between flue gas 176 and ammonia-based liquid 182, a portion of flue gas 176 is immobilized in micro-pores 178 of membrane contactor 170 so that each gas-liquid interface 180 is located at a mouth of each micro-pore 178.

Because membrane contactors 170 serve as partitions between flue gas 176 and ammonia-based liquid 182, a gas-liquid contact area is not disturbed by variations in flow rates. As a result of membrane contactor 170 and pressure control, scrubber 130 facilitates transferring flue gas 176 and ammonia-based liquid 182 over a wider range of independent flow rates as compared to flow rates of gas and liquids used in known scrubber systems. Membrane contactor 170 and pressure control also facilitate reducing flooding, channeling, and/or back-mixing of ammonia-based liquid 182 into micro-pores 178. As such, scrubber 130 can tolerate a wider range of variations in flue gas processing conditions as compared to known scrubber systems. Membrane contactors 170 also facilitate reducing foaming and/or solvent degradation by reducing dispersion of potential ammonia-degrading impurities in flue gas 176 in ammonia-based liquid 182. Because the driving force for $CO_2$ separation from flue gas 176 is a pressure gradient, a density difference between gas and liquid components are not required. As a result, membrane contactors 170 require no selectivity to $CO_2$ separation from flue gas 176 as compared to known porous separation membranes.

In the exemplary embodiment, scrubber 130 includes a hybrid of membrane contactor 170 and ammonia-based liquid to facilitate $CO_2$ separation from flue gas 176. Because scrubber 130 includes membrane contactor 170, a gas-liquid surface contact area is increased as compared to known scrubber systems that attempt to separate $CO_2$ only by known chemical absorption processes therein. As a result, membrane contactors 170 may be densely packaged as bundles and/or modules to facilitate reducing a scrubber size as compared to known scrubber systems. Because membrane contactor 170 is fabricated from a micro-porous hydrophobic material such as PTFE, membrane contactor 170 acts as an inert material barrier in flue gas processing. Because ammonia-based liquid 182 is used as a liquid separating agent, the amount of liquid for chemical absorption of a given amount of $CO_2$ is less than an amount required for other liquid separating agents. As a result, use of ammonia facilitates reducing a scrubber size as compared to a size of known scrubber systems. Also, use of ammonia-based liquid 182 facilitates reducing an amount of regeneration energy used to release $CO_2$ in stripper 150 as compared to regeneration of $CO_2$ from other liquid separating agents. Overall, scrubber 130 facilitates reducing equipment size and/or capital costs associated with flue gas processing to separate, absorb, and release $CO_2$ to reduce such emissions.

Exemplary embodiments of scrubbers are described in detail above. The scrubbers are not limited to use with the specified combustion systems described herein, but rather, the combustors can be utilized independently and separately from other combustion system components described herein. Although the exemplary methods and systems are described above with respect to coal or natural gas plants, it should be appreciated that the exemplary scrubber systems and methods are also applicable to other combustion systems such as, but not limited to, combustion engines. Moreover, the invention is not limited to the embodiments of the combustors described in detail above. Rather, other variations of scrubber embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for processing flue-gas that contains carbon dioxide ($CO_2$), said method comprising:
    providing an absorber unit having a membrane contactor that has a surface area of about 10 to about 100 $m^2/gr$ and a void volume of about 90% to about 95%;
    channeling a combustion flue gas along a first surface of the membrane contactor;
    channeling an ammonia-based liquid reagent along a second opposing surface of the membrane contactor;
    coupling a desorber unit in flow communication with the absorber unit to receive carbon dioxide ($CO_2$)-laden ammonia-based liquid reagent from the absorber unit; and
    channeling lean ammonia-based liquid reagent discharged from the desorber unit through a steam generator coupled in flow communication between the desorber unit and the absorber unit.

2. A method in accordance with claim 1 further comprising coupling a desorber unit to the absorber unit.

3. A method in accordance with claim 2 further comprising channeling the $CO_2$-rich ammonia-based liquid to the desorber unit.

4. A method in accordance with claim 3 further comprising heating the $CO_2$-rich ammonia-based liquid to release $CO_2$ from the $CO_2$-rich ammonia-based liquid.

5. A method in accordance with claim 1 wherein providing an absorber unit having a membrane contactor comprises providing an absorber unit having a hydrophobic membrane contactor.

6. A method in accordance with claim 1 wherein providing an absorber unit having a membrane contactor comprises providing an absorber unit having an expanded polytetrafluoroethylene membrane contactor.

7. A combustion system comprising:
an absorber unit comprising:
a housing for channeling a combustion flue gas that contains carbon dioxide ($CO_2$);
an ammonia-based liquid reagent channeled within said housing;
a membrane contactor positioned within said housing, wherein said membrane contactor comprises a first surface, a second opposing surface, and a plurality of pores defining gas-liquid interface areas and having a surface area of about 10 to about 100 $m^2$/gr and a void volume of about 90% to about 95%, the combustion flue gas is channeled along said first surface and said ammonia-based liquid reagent is channeled along said second opposing surface; and
a desorber unit coupled to said absorber unit, wherein said desorber unit receives and releases $CO_2$ from the $CO_2$-rich ammonia-based liquid; and
a steam generator coupled between said desorber unit and said absorber unit, such that lean ammonia-based liquid reagent discharged from the desorber unit is channeled through said steam generator prior to entering said absorber unit.

8. A combustion system in accordance with claim 7 wherein said membrane contactor comprises a hydrophobic material.

9. A combustion system in accordance with claim 7 wherein said membrane contactor comprises an expanded polytetrafluoroethylene material.

10. A combustion system in accordance with claim 7 wherein said membrane contactor comprises a plurality of hollow fibers.

11. A combustion system in accordance with claim 10 wherein said plurality of hollow fibers is packaged in a tube-and-shell arrangement.

12. A combustion system in accordance with claim 7 wherein said membrane contactor comprises a substantially planar sheet.

13. A combustion system in accordance with claim 12 wherein said substantially planar sheet is packaged as a spiral-wound module.

14. A flue-gas processing system comprising:
a housing for channeling a combustion flue gas that contains carbon dioxide ($CO_2$);
an ammonia-based liquid reagent channeled within said housing; and
a membrane contactor positioned within said housing, wherein said membrane contactor comprises a first surface, a second opposing surface, and a plurality of pores defining gas-liquid interface areas, said membrane contactor having a surface area of about 10 to about 100 $m^2$/gr and a void volume of about 90% to about 95%, the combustion flue gas is channeled along said first surface and said ammonia-based liquid reagent is channeled along said second opposing surface;
a desorber unit coupled to said housing for receiving carbon dioxide (CO2)-laden ammonia-based liquid reagent from said housing; and
a steam generator coupled in flow communication with said desorber unit, for receiving a lean ammonia-based liquid reagent discharged from said desorber unit and for channeling the lean ammonia-based liquid reagent to said housing.

15. A flue-gas processing system in accordance with claim 14 wherein said membrane contactor comprises a hydrophobic material.

16. A flue-gas processing system in accordance with claim 14 wherein said membrane contactor comprises an expanded polytetrafluoroethylene material.

17. A flue-gas processing system in accordance with claim 14 wherein said membrane contactor comprises a plurality of hollow fibers.

18. A flue-gas processing system in accordance with claim 17 wherein said plurality of hollow fibers is packaged in a tube-and-shell arrangement.

19. A flue-gas processing system in accordance with claim 14 wherein said membrane contactor comprises a substantially planar sheet.

20. A flue-gas processing system in accordance with claim 19 wherein said substantially planar sheet is packaged as a spiral-wound module.

* * * * *